(12) United States Patent
Okada et al.

(10) Patent No.: US 10,824,202 B2
(45) Date of Patent: Nov. 3, 2020

(54) HYBRID FRAME POWER SLEEVE CASE

(71) Applicant: Incase Designs Corp., Los Angeles, CA (US)

(72) Inventors: Kenji Okada, Long Beach, CA (US); Hyun Hong, Los Angeles, CA (US); Dominique Velasco Fonacier, Alhambra, CA (US); Kevin I-Feng Fang, Chino, CA (US)

(73) Assignee: INCASE DESIGNS CORP., Irvine, CA (US)

( * ) Notice: Subject to any disclaimer, the term of this patent is extended or adjusted under 35 U.S.C. 154(b) by 0 days.

(21) Appl. No.: 16/245,199

(22) Filed: Jan. 10, 2019

(65) Prior Publication Data
US 2019/0386267 A1 Dec. 19, 2019

Related U.S. Application Data

(60) Provisional application No. 62/615,938, filed on Jan. 10, 2018.

(51) Int. Cl.
*G06F 1/16* (2006.01)
*A45C 11/00* (2006.01)
*H01M 2/10* (2006.01)

(52) U.S. Cl.
CPC ............ *G06F 1/1656* (2013.01); *A45C 11/00* (2013.01); *H01M 2/1066* (2013.01); *A45C 2011/003* (2013.01); *G06F 2200/1633* (2013.01)

(58) Field of Classification Search
CPC .......... G06F 2200/1633; G06F 1/1637; G06F 1/1635; G06F 1/1616; G06F 1/1626; G06F 1/1656
See application file for complete search history.

(56) References Cited

U.S. PATENT DOCUMENTS

| 8,929,065 B2 * | 1/2015 | Williams | G06F 1/1632 |
| | | | 361/679.41 |
| 9,706,026 B2 * | 7/2017 | Carnevali | G06F 1/1628 |

(Continued)

*Primary Examiner* — Xanthia C Cunningham

(57) ABSTRACT

Disclosed is a battery sleeve case for a portable electronic device (e.g., laptop computer or electronic tablet device) that includes an elastic polymer frame structure that extends around a perimeter of the sleeve to provide cushioning or padding to the sides of the device. Front and back face side panels are attached to opposing sides of the frame structure, via stitching or some other suitable means. The frame structure may be formed of injected molded ethylene vinyl acetate (EVA) or other suitable material. The side panels may be laminated with fabric, with a front face side panel being flexible and cushioned and including one or more access flaps. The back face side panel includes a rechargeable battery housed within a battery compartment defined by a semi rigid outer panel, which may be formed of compression molded EVA or other suitable material. The rechargeable battery is electrically coupled to external and internal electrical interfaces. One or more inductive charging components are provided to enable wireless charging of the portable electronic device when the device is in the protective case and wireless charging of the rechargeable battery. A user accessible activation control enables power flow to and from the rechargeable battery. The case allows the portable electronic device to be charged both in and outside of the case.

20 Claims, 15 Drawing Sheets

(56) References Cited

U.S. PATENT DOCUMENTS

| | | | |
|---|---|---|---|
| 2009/0213536 A1* | 8/2009 | Lewandowski | G06F 1/1632 361/679.43 |
| 2012/0045932 A1* | 2/2012 | Carnevali | G06F 1/1632 439/552 |
| 2014/0274204 A1* | 9/2014 | Williams | H02J 7/0013 455/556.1 |

* cited by examiner

HYBRID FRAME POWER SLEEVE CASE

CROSS-REFERENCE TO RELATED APPLICATIONS

This application claims the benefit of, and priority to, U.S. Provisional Application No. 62/615,938, filed on Jan. 10, 2018, which is hereby incorporated herein by reference in its entirety.

BACKGROUND

This disclosure relates to accessories for electronic devices and more specifically to battery cases for portable electronic devices including for example laptop computers and computing tablets.

With each new generation, portable electronic devices provide greater functionality and more capabilities. They allow people to play and record music and video, send and receive e-mail and text messages, browse Web pages, make phone calls, take and view pictures, edit documents, and much more. They have, in many ways, revolutionized the way people interact, learn, connect with each other, consume media content, conduct business, perform daily tasks at work, home, and on the road, and store valuable information including personal information (e.g., phone numbers, financial information, private photos or videos, and favorite music tracks).

While portability allows these devices to be easily carried or moved about by the user, it also makes these devices more vulnerable to being accidentally dropped, hit, or scratched as compared to non-portable devices such as desktop computers. The damage incurred may n not only be cosmetic (e.g., scratch) but also may render unusable functional features, as such devices frequently contain sensitive and fragile components (e.g., screen, outer casings, camera lens, flash, processors, storage drives, accelerometers, and sensors) that can be easily damaged by impact, fluid or other detrimental environmental conditions. The portability of these devices also gives rise to concerns regarding access to power. While such devices are battery powered, it is not uncommon for users to experience difficulty to conveniently access power to charge their device while traveling or in remote environments.

Protective cases, such as those described in U.S. Pat. No. 9,642,428, are used to protect portable electronic devices from possible damage. There is a need, however, for such protective cases that also provide convenient and accessible portable power to charge and/or power such devices.

SUMMARY

A unique protective battery sleeve case for a portable electronic device (e.g., laptop computer or electronic tablet device) is disclosed. In an implementation, the case includes front face and back face side panels that are attached to an elastic polymer frame, such as one formed of injected molded ethylene vinyl acetate (EVA), which surrounds the perimeter of the sleeve compartment to provide cushioning or padding to the sides of the portable electronic device when the device is inserted into the sleeve. The front face side panel is comprised of a cushioned flexible construction, while an opposing back face side panel employs a semi rigid outer panel construction that defines a battery compartment that houses a rechargeable battery. The rechargeable battery is electrically coupled to a plurality of interfaces that facilitate control and power to and from the sleeve battery. The interfaces include one or more internal electrical connectors mounted in the sleeve compartment. The internal connectors are selected and positioned to electrically communicate with the portable electronic device and thereby facilitate charging of the device when the device is inserted in and protected by the sleeve. The inclusion of multiple internal connectors allows for multiple connection points that are capable of connecting to the device when the device is inserted into the sleeve, which for example would be capable of facilitate charging of the device even if the device is inserted into the sleeve from either end or face-up or face down. The electrical interfaces also include one or more external electrical connectors that are accessibly positioned on the outside of the sleeve and that facilitate charging of one or more electronic devices that are located outside or external to the case as well as charging of the sleeve battery from a power source. A connector cable is provided to facilitate charging. A battery fuel or charge gauge together with an activation button are also provided on the outside of the case to allow status monitoring of the rechargeable battery and control over power to and from the sleeve. A magnetic or other latching mechanism is used to secure an opening on one side of the sleeve.

The various construction, manufacture, configuration, and combination of the components of the case constitute separate aspects of the invention disclosed herein.

BRIEF DESCRIPTION OF THE DRAWINGS

These and other objects, features, aspects and advantages of the present disclosure are described below, or become apparent upon consideration of the detailed description with reference to the drawings, which are intended to illustrate, but not to limit, the invention. In the drawings, like reference characters denote like features throughout the figures.

DETAILED DESCRIPTION OF THE EMBODIMENTS

Incase Designs Corp. of Los Angeles, Calif. is a manufacturer of accessory cases for electronic devices including electronic tablet devices. The Incase Web site is www.incase.com, which is incorporated by reference along with all product packaging and documentation as of the filing date of this application. U.S. Pat. No. 9,642,428, owned by Incase, is directed to a sleeve case and is hereby also incorporated by reference in its entirety.

In a specific implementation, the case or sleeve is for a portable electronic device such as a tablet such as Apple® iPad products including the iPad®, iPad Pro®, and iPad Mini® models or notebook computer products including the Apple® MacBook®, MacBook Pro®, and MacBook Air® products, described at the Apple Web site, www.apple.com, which is incorporated by reference in this application.

Figure 17A:
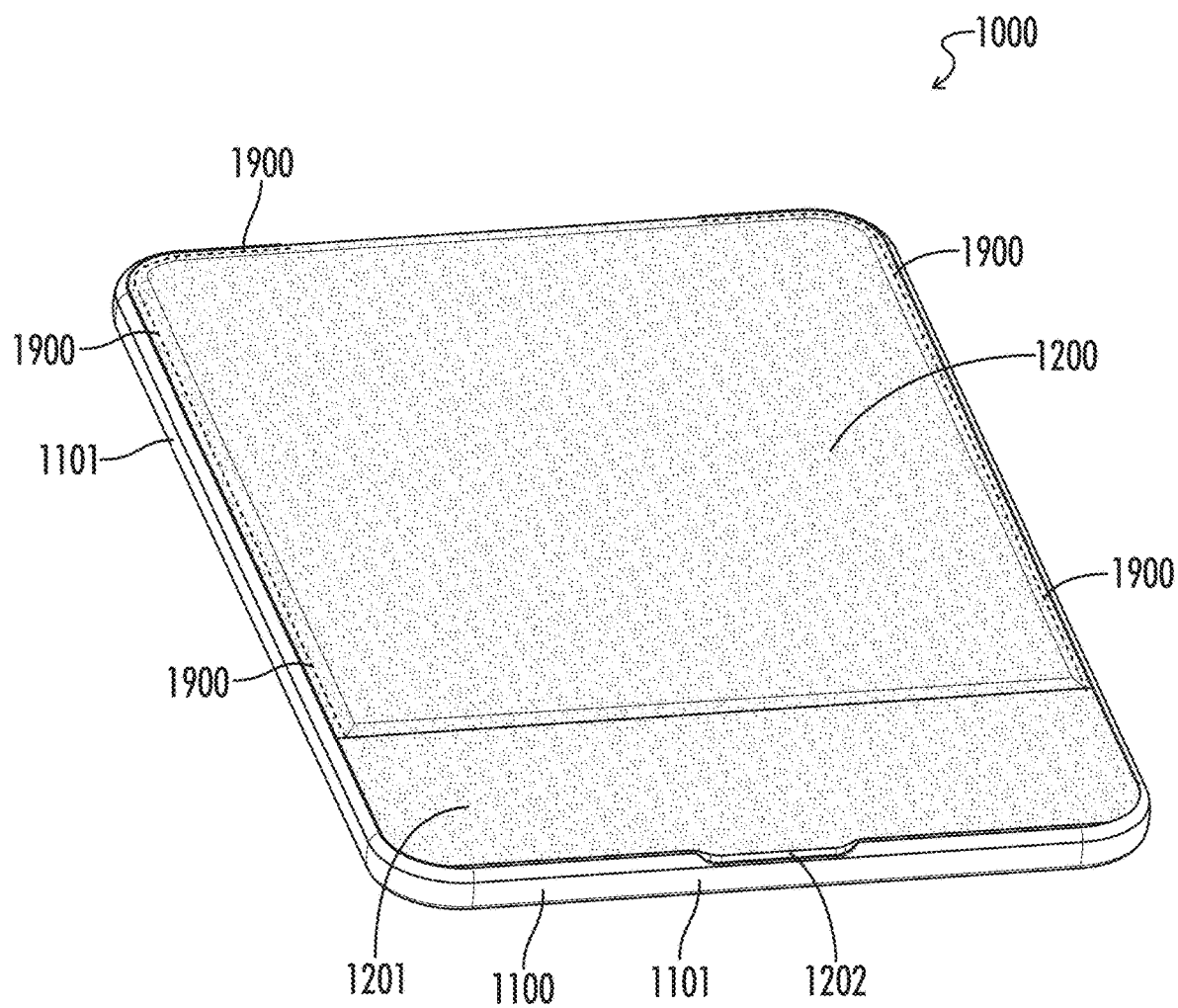
FIG. 17A-G are photographs of a prototype of the case illustrated in FIG. 1 that further illustrate the construction and operation of the case.
Figure 17B:
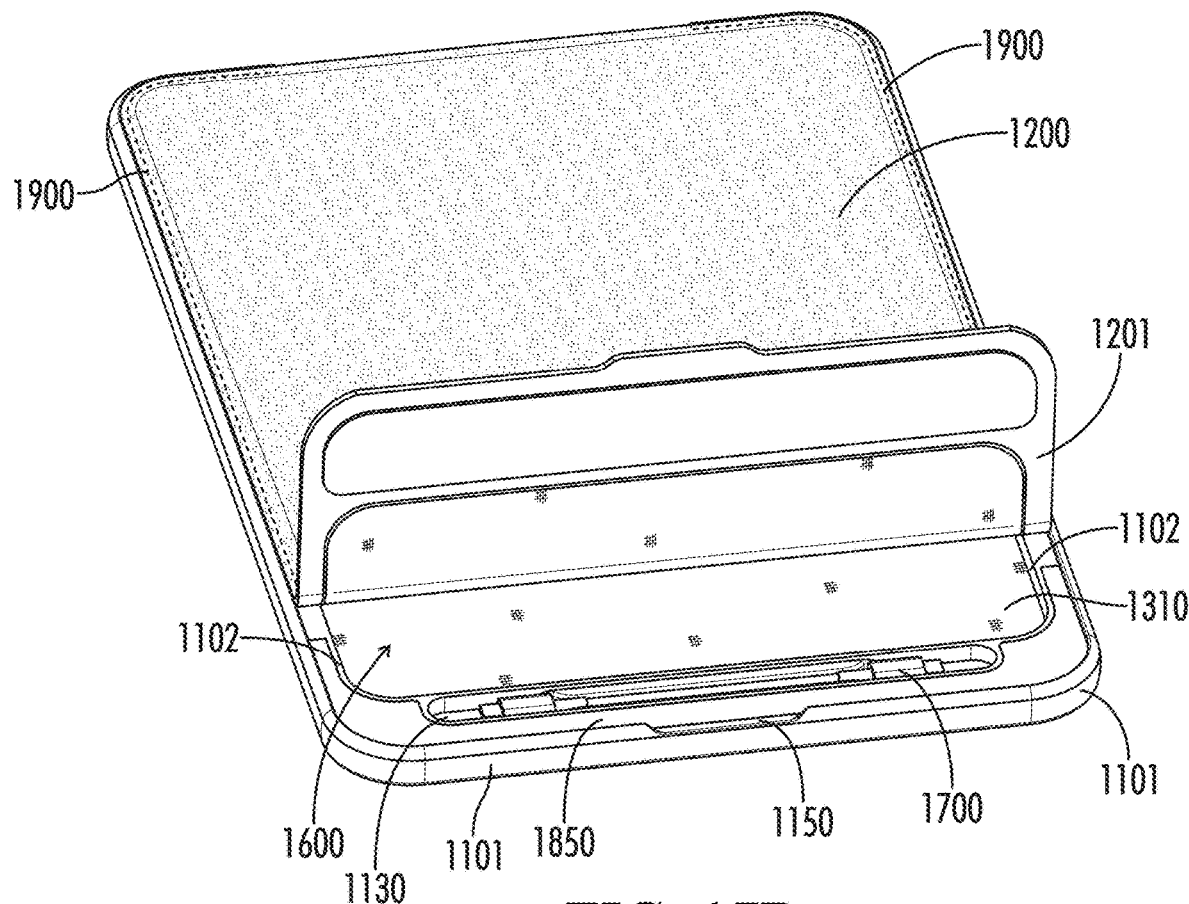
Figure 17C:
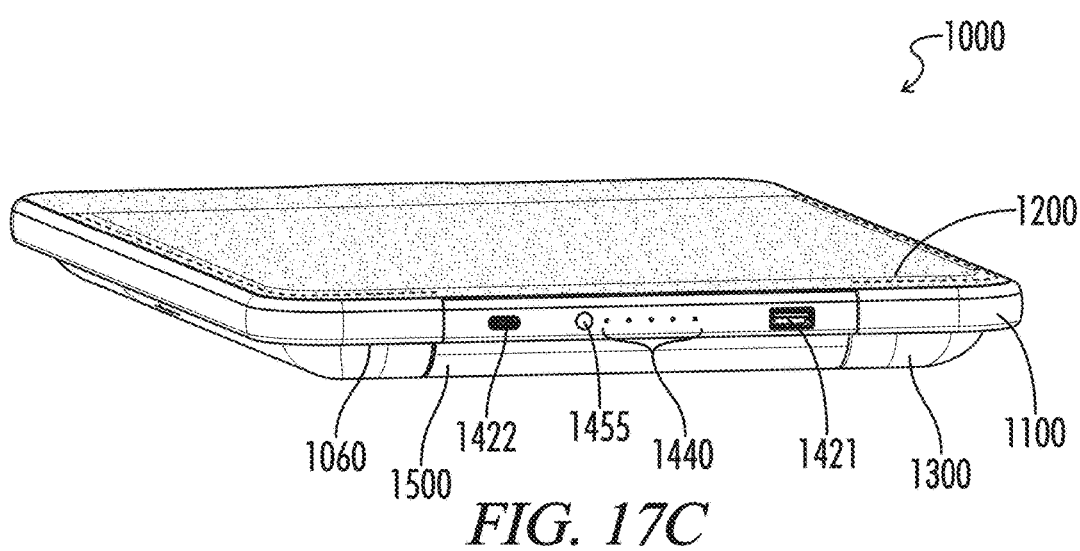
Figure 17D:
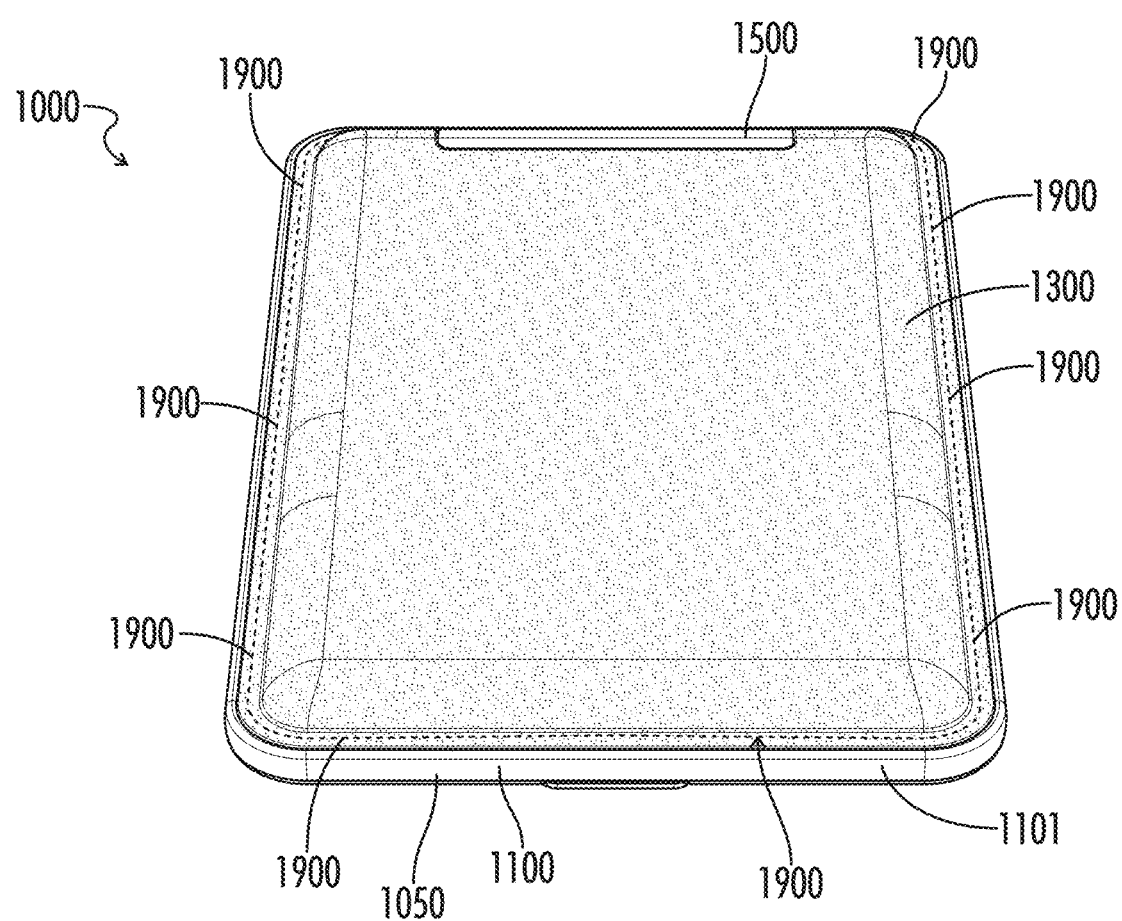
Figure 17E:
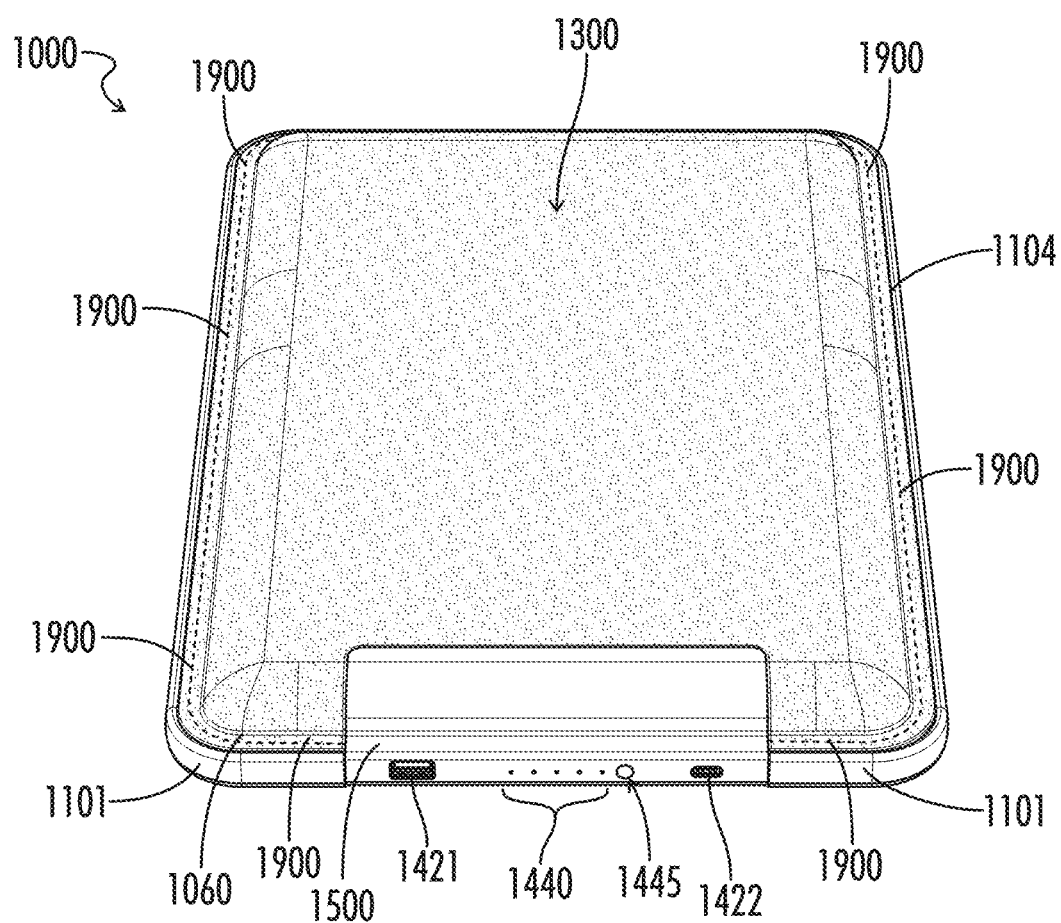
Figure 17F:
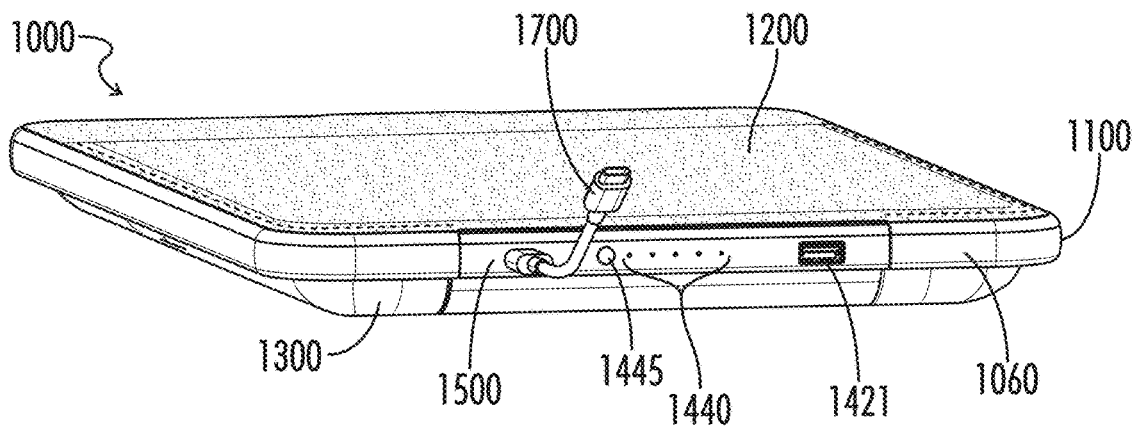
Figure 17G:
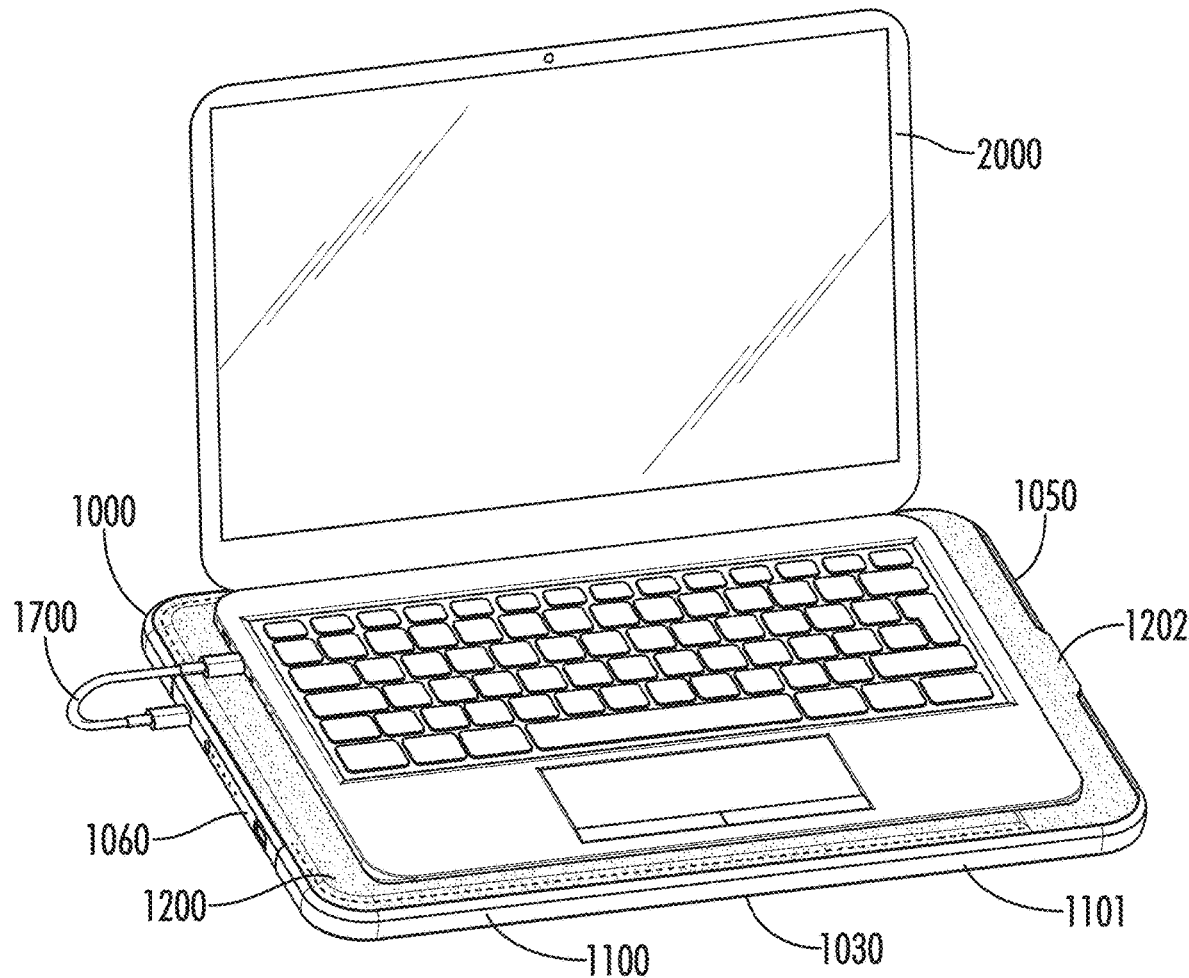

FIGS. 1-18 illustrate a hybrid frame power sleeve case 1000 for a portable electronic device 2000, such as a laptop computer or computing tablet. The particular sleeve case illustrated in the drawings is configured for a Macbook Pro® such as the one shown in FIG. 17G. The case 1000 is capable of allowing the user to charge the portable electronic device, with or without wire, whether the device is in, or outside, the case. In addition, the case is capable of charging other devices connected to the electrical interface connectors, which also allow the sleeve case to be charged through outside power sources.

In the illustrated implementation, the case 1000 is rectangular in shape with rounded corners and includes front face, back face, left, right, top and bottom sides 1010, 1020, 1020, 1030, 1040, 1050 and 1060 respectively. The shape of the case 1000, and particularly the device compartment 1600, generally corresponds to the external shape of portable electronic device the case is configured for, which for laptop computers would be determined when the laptop is in the fully closed position, such that the screen is closed over the keyboard.

The case 1000 is comprised of a frame structure 1100, a front face panel 1200, and a back face panel 1300. The back face panel 1300 houses a rechargeable battery 1325, which is connected to external and internal electrical interfaces 1421, 1422, 1431 and 1432, respectively, via a printed circuit board (PCB) 1410 that facilitates and controls the charging operation is of the sleeve case's rechargeable battery 1325. The PCB 1410 is secured to the case via a rigid mounting support 1500 that is attached to the back face panel 1300 via mechanical means (e.g., screws, rivets, or the like) and/or adhesive or other suitable means. An LED battery charge gauge or fuel gauge 1440 is also electrically connected to the PCB and mounted to the case so as to be externally visible to the user. A user activation button 1445 is provided and electrically connected to the PCB and mounted to the case to allow the user to externally engage and activate the charging operations of the case.

The front and back face panels 1100 and 1200 are attached to the frame structure 1100 on opposing sides thereto via stitching 1900 and/or other suitable technique (e.g., glue, epoxy, welding, and/or fusing). When assembled the front face panel 1200 and the perimeter region of the back face panel 1300 are flush or almost flush with the adjacent region of the exterior edge 1001 surface of the frame structure 1100 so as to provide an integrated and seamless appearance and construction. It should be understood, however, in some implementations, the front and/or back face panel may be slightly below (e.g., slightly lower) or slightly above (e.g., slight higher) the adjacent regions of the exterior edge 1001 of frame structure 1100.

To provide access to the case, the front face panel 1200 includes an access flap 1201 (best illustrated in FIG. 17B) that bends along a fold line and allows the user to open the sleeve and slide the portable electronic device into and out of the sleeve compartment 1600. To bias or otherwise keep the access flap 1201 in the closed position, magnetic elements or material (e.g., iron sheet) is incorporated into or otherwise attached to the flap 1201. The magnetic elements or material in the access flap 1201 are positioned so that they overlie the magnets 1800 when the flap is in the closed position so that the magnetic attraction there-between keeps the flap closed. Opening the access flap 1201 also allows the user to also access a connector cable 1700 that may be employed to connect a portable electronic device to the rechargeable battery 1325 to facilitate charging of the device as, for example, illustrated in FIG. 17G.

The front face panel 1200 and frame structure 1100 may be formed of any suitable material and construction, such as the construction for the front panel 1105, 1115 described in U.S. Pat. No. 9,642,428. In the illustrated embodiment, the front face panel 1200 is comprised of a multilayered flexible construct that includes a cushion core (such as neoprene or polychloroprene, synthetic rubber, other cushioning material) overlaid by synthetic or natural fabric on its inner and outer surfaces. The fabric may be laminated or otherwise adhesively attached or adhered to the cushioning core. The fabric laminated on the outside surface of the cushion core layer may be different than the fabric laminated on the inside surface of the cushion core, which may be softer and less abrasive (e.g., a faux fur lining), to protect the outer surfaces of the portable device. Once the multilayered construct of the front face panel 1200 is formed, the construct is cut to size and attached to the frame structure 1100, by stitching or other technique as previously described.

Figure 14:
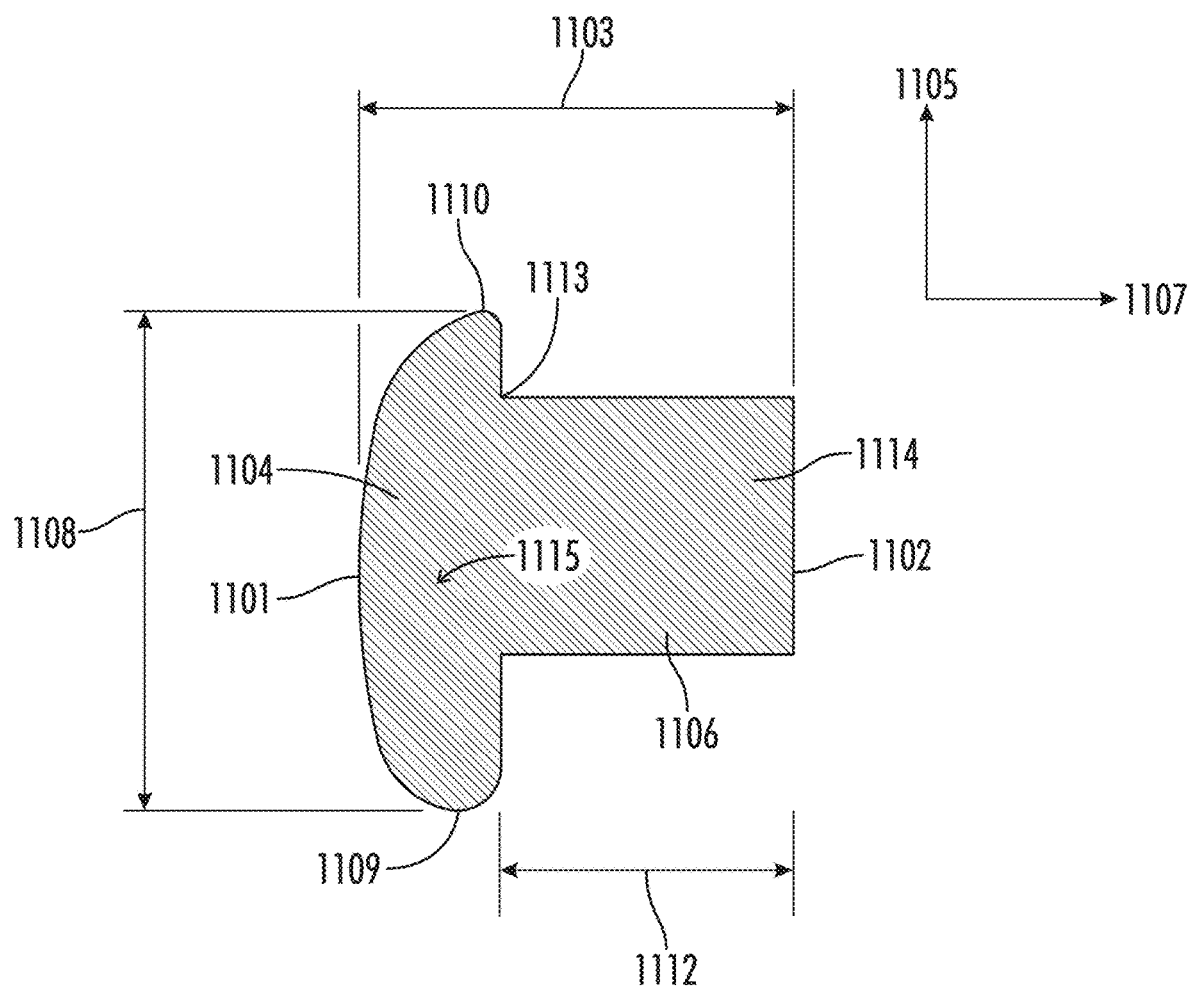
FIG. 14 is a cross section view line drawing of the frame structure illustrated in FIG. 12 taken along line 14-14 as illustrated in FIG. 12.

The frame structure 1100 (best illustrated in FIGS. 9, 12, 13, 14 and 15) is comprised of a frame border having an exterior edge 1101 and interior edge 1102. The exterior and interior edges are separated by the width 1003 of the frame border. The interior edge surrounds a perimeter of a device compartment 1600. As best illustrated in FIG. 14, the frame structure 1000 has a generally T-shaped cross section and includes a first portion 1104 extending in a first direction 1105 and a second portion 1106 extending in a second direction 1007, transverse to the first direction. The first portion 1104 comprises the exterior edge 1101 and the second portion 1106 comprises the interior edge 1102. The first portion 1104 has a first length 1108 from a first end 1109 (which is located at the back face side 1020) to a second end 1110 (which is located at the front face side 1010) in the first direction 1105. The second portion 1106 has a second length 1112 from a third end 1113 to a fourth end 1114 (which is located at the interior edge 1102) in a second direction 1107. The second portion 1106 is coupled to the first portion 1104, at a point 1115 between the first and second ends 1109, 1110 and extends in the second direction 1107 away from the first portion 1104 a second length 1112.

As best illustrated in FIGS. 9, 12-13 and 15, the configuration and lengths 1108 and 1112 of the first and second portions 1104, 1106 respectively vary depending on the location where the cross section is taken. In the illustrated embodiment, the left and right sides 1030, 1040 of the frame structure 1100 are symmetrical and have a uniform cross-section such as that depicted in FIG. 14. The frame structure 1000 at the top end 1050 of the case 1000, in contrast has a second portion 1106 that has a substantially longer length 1112 than the second portion 1106 located at the sides 1030, 1040 of the case 1000 and includes therein internal compartments 1120 for housing magnets 1800 and an internal compartment 1130 that is configured to retentively secure and house the cable 1700 therein. In addition, the second portion 1106 of the frame structure 1100 that resides at the top side 1050 of the case 1000 includes a recessed region 1140 that is configured to receive and be covered, in a flush configuration, by a magnet cover 1850 which assists in maintaining the magnets 1800 in place with their compartments 1120. The magnet cover 1850 can be attached by glue, epoxy, welding, fusing, lamination, or other technique for attaching polymers.

The frame structure in an implementation is formed of injected molded ethylene vinyl acetate (EVA) as a unitary component as described in U.S. Pat. No. 9,642,428. Other suitable, materials may also be used. The material that forms the cushion core of the front face panel 1200 may be the same or different than the material that forms the frame structure 1100. In one implementation, the cushion core of the front face panel 1200 is formed of a neoprene sheet and the frame structure 1100 is formed of injected molded ethylene vinyl acetate (EVA).

Figure 1:
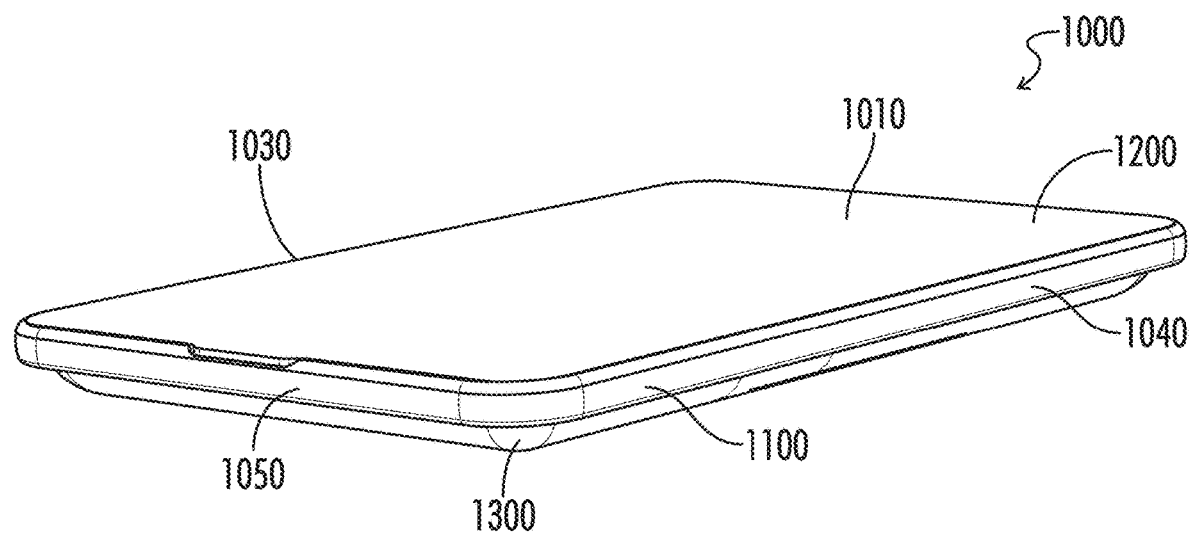
FIG. 1 is a front face perspective view rendering of a hybrid frame power sleeve case taken from the top end of the case.
Figure 2:
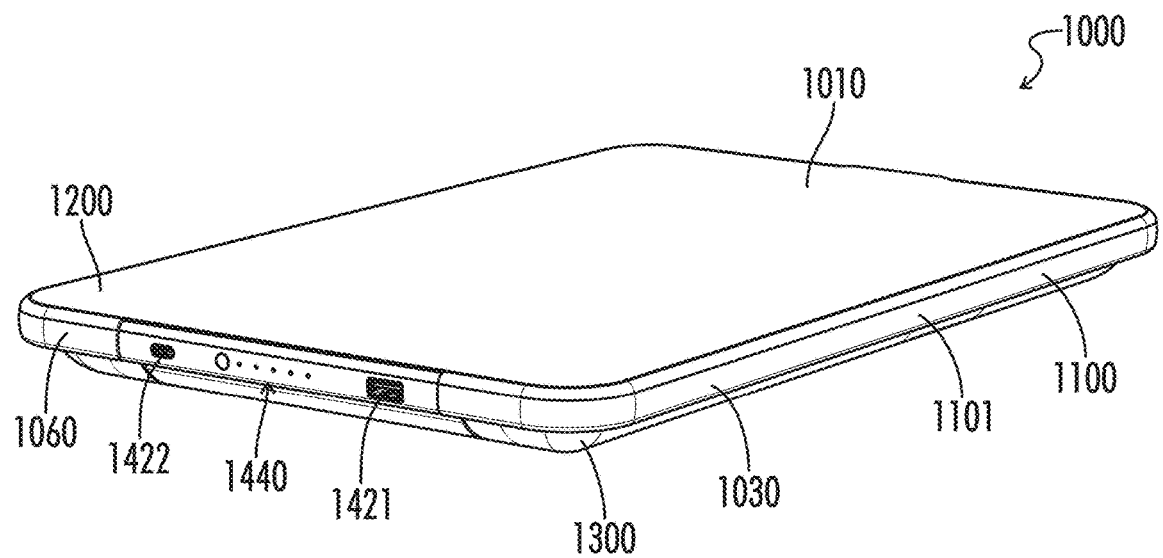
FIG. 2 is a front face perspective view line drawing of the case depicted in FIG. 1 taken from the bottom end of the case.
Figure 3:
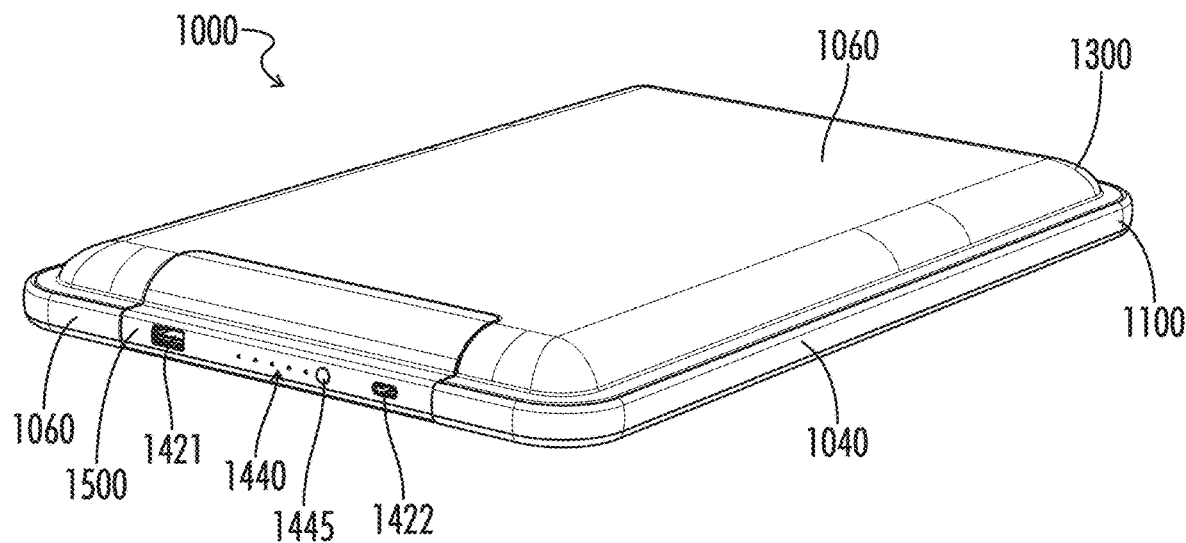
FIG. 3 is a back face perspective view rendering of the case depicted in FIG. 1 taken from the bottom end of the case.
Figure 4:
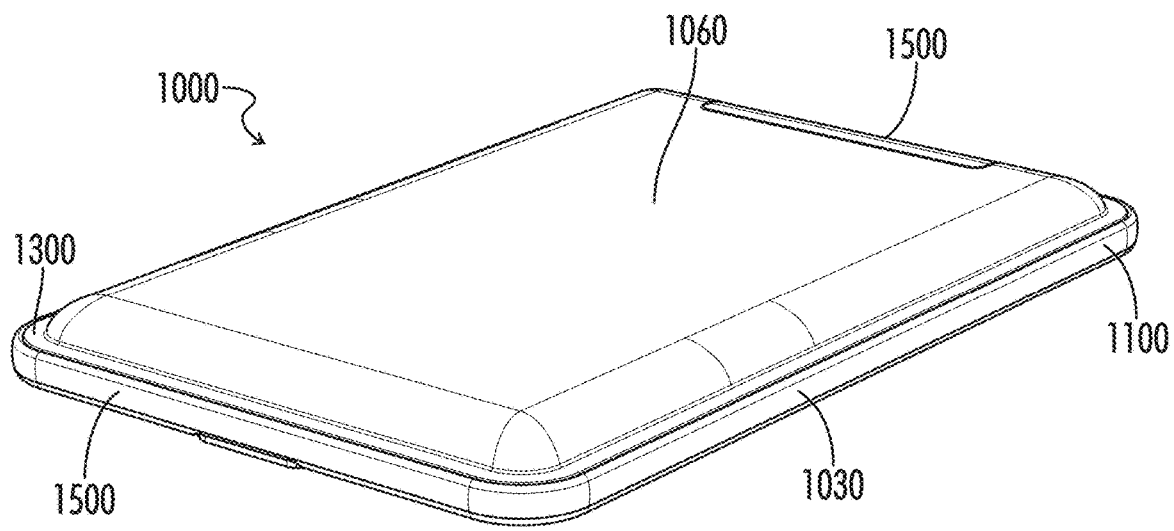
FIG. 4 is a back face perspective view line drawing of the case depicted in FIG. 1 taken from the top end of the case.
Figure 5:
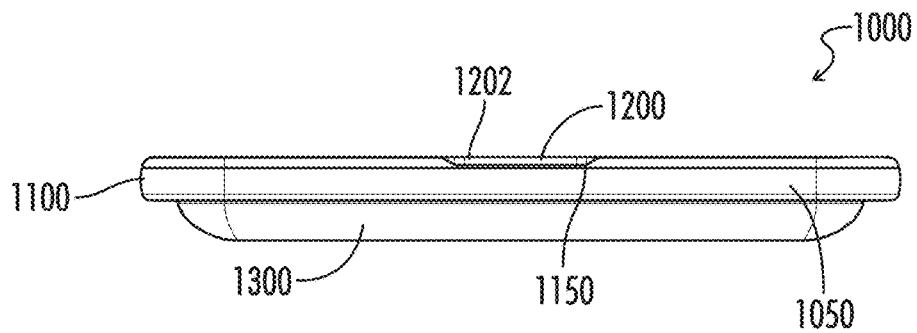
FIG. 5 is a top end side view line drawing of the case depicted in FIG. 1.
Figure 6:
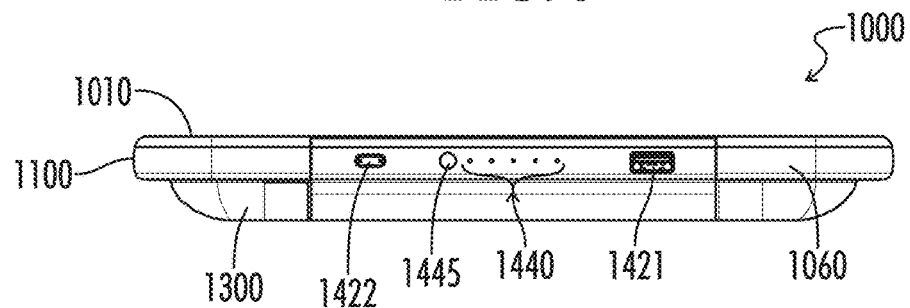
FIG. 6 is a bottom end view line drawing of the case depicted in FIG. 1.
Figure 7:
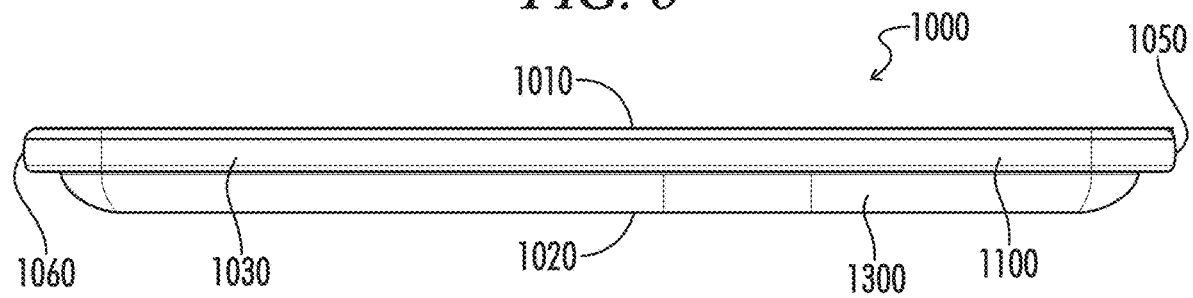
FIG. 7 is a left side view line drawing of the case depicted in FIG. 1.
Figure 8:
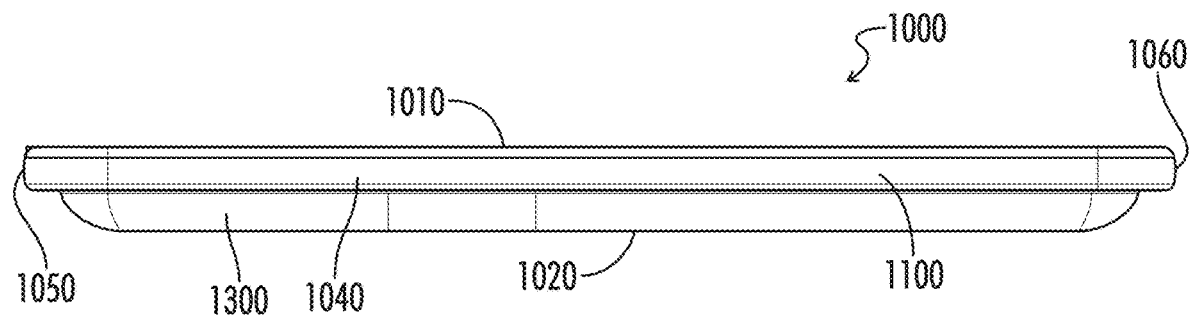
FIG. 8 is a right side view line drawing of the case depicted in FIG. 1.
Figure 9:
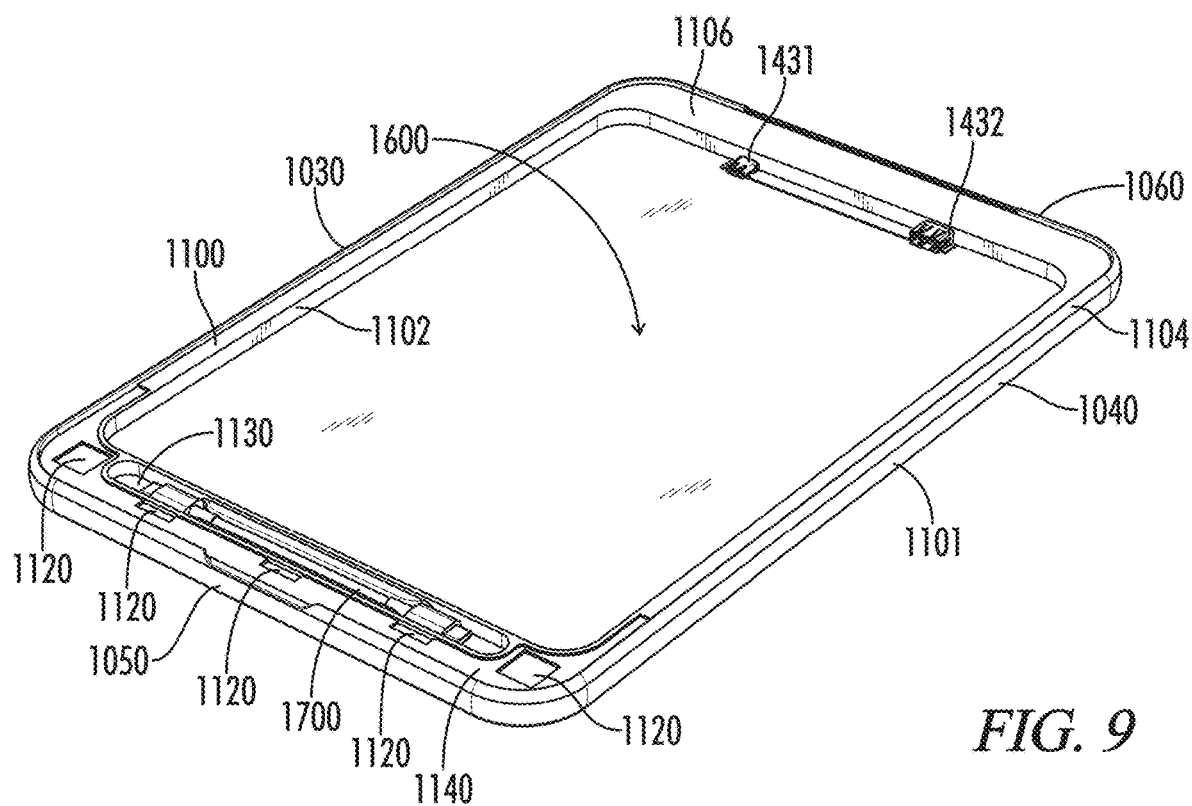
FIG. 9 is a front face perspective view line drawing of the case as depicted in FIG. 1 with the front face side panel, magnet cover and magnets removed to better illustrate the portable electronic device compartment, connector cable and cable compartment, and the internal charging interfaces located on the periphery the device compartment.
Figure 10:
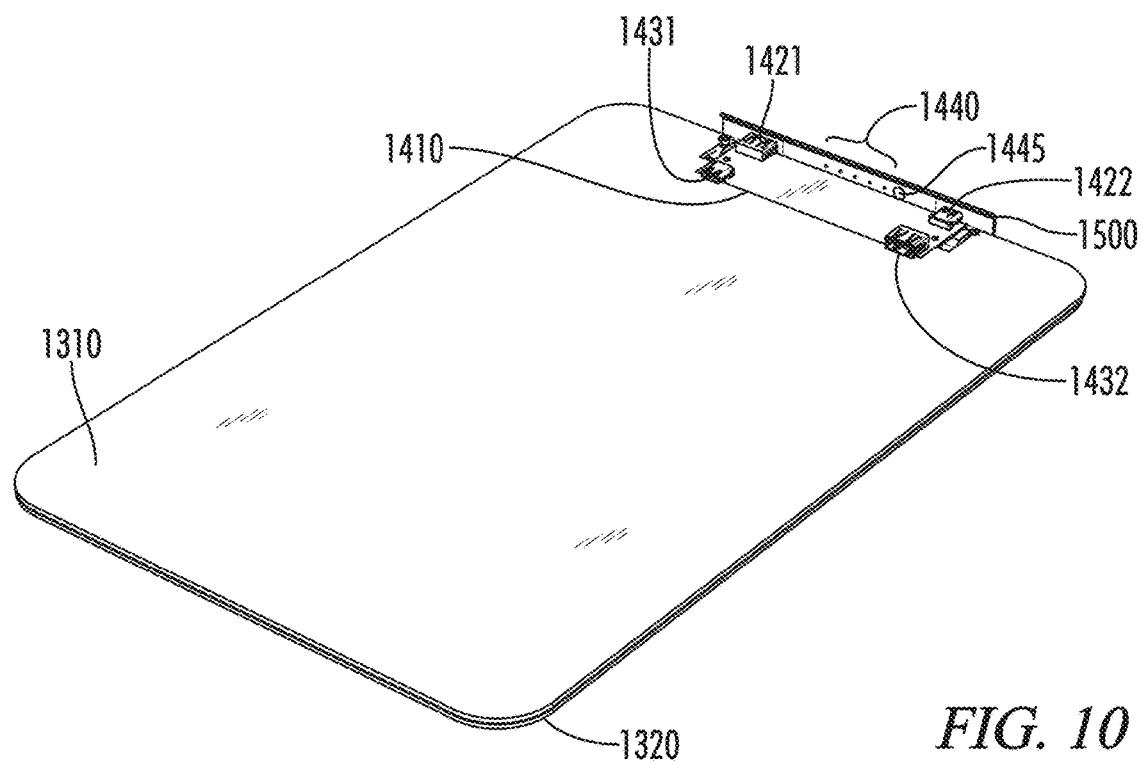
FIG. 10 is a perspective view line drawing of the case depicted in FIG. 9 with the frame structure and connector cable removed to better illustrate the internal panel of the back face side panel, the PCB and the controls and electrical interfaces coupled thereto.
Figure 11:
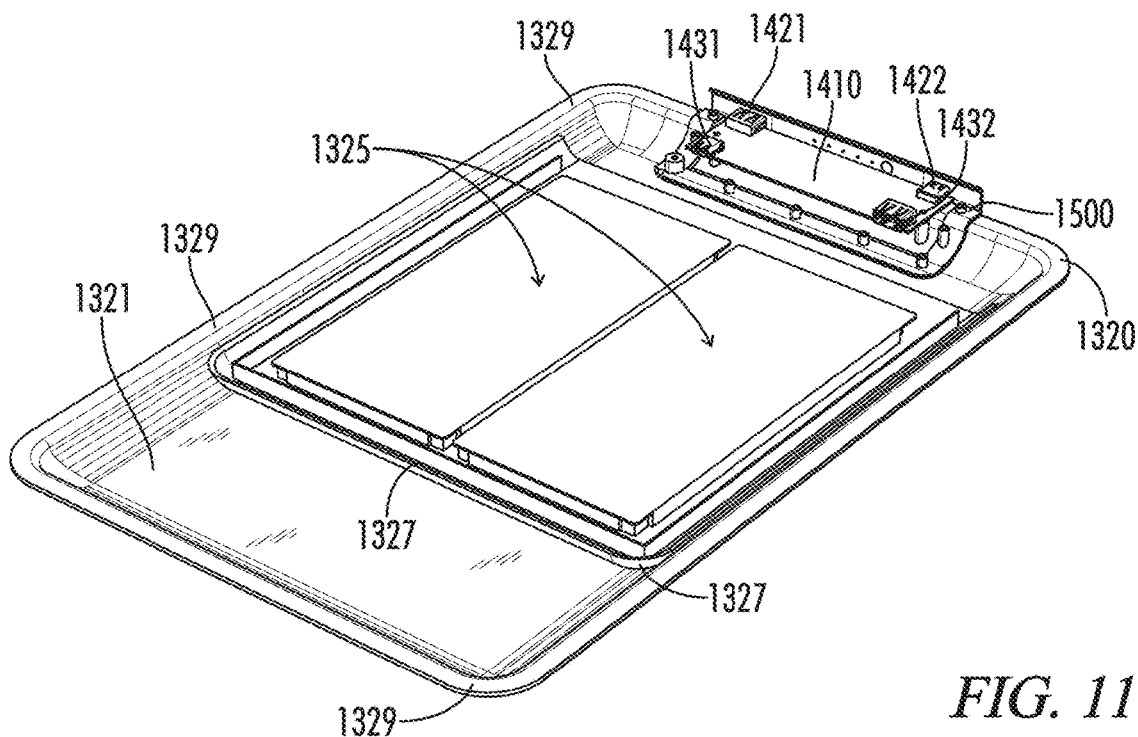
FIG. 11 is a perspective view line drawing of the case depicted in FIG. 10 with the internal panel of the back face side panel removed to better illustrate the battery compartment, rechargeable battery housed therein, and the internal configuration of the outer panel of the back face side panel.
Figure 12:
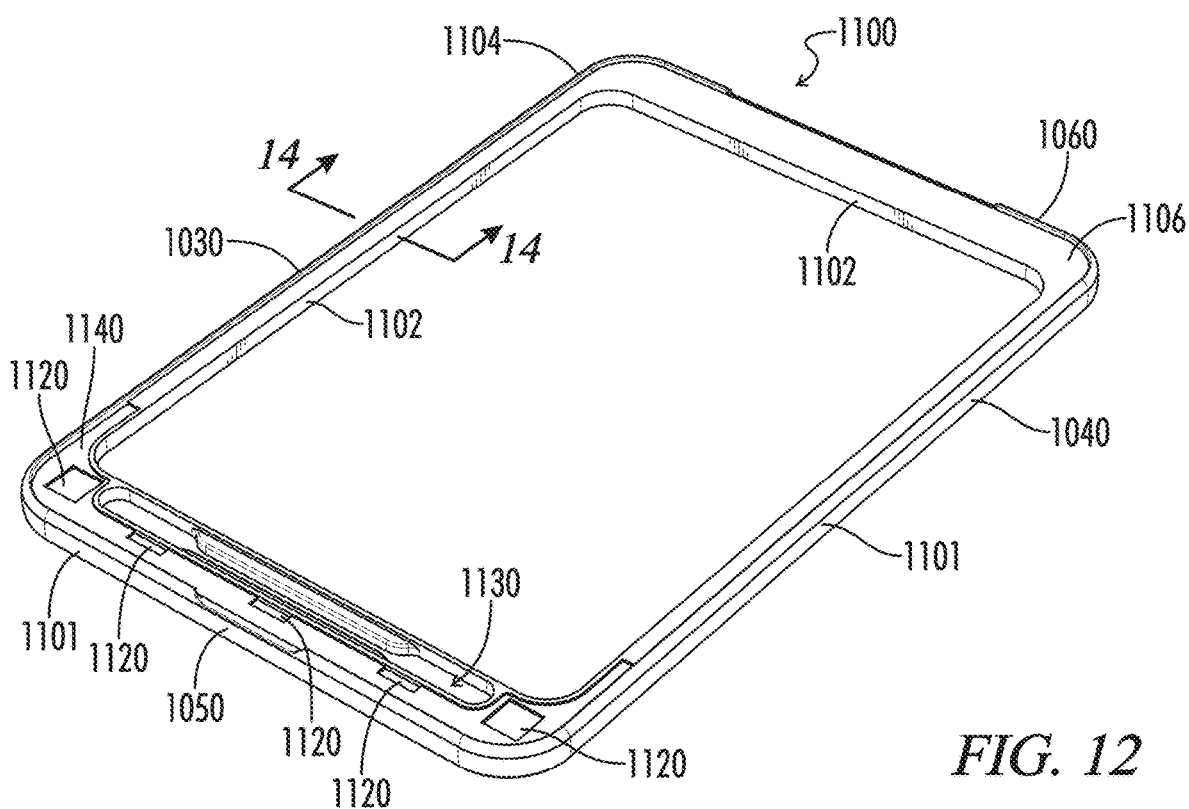
FIG. 12 is a front face perspective view rendering of the frame structure employed in the case illustrated in FIG. 1 in isolation.
Figure 13:
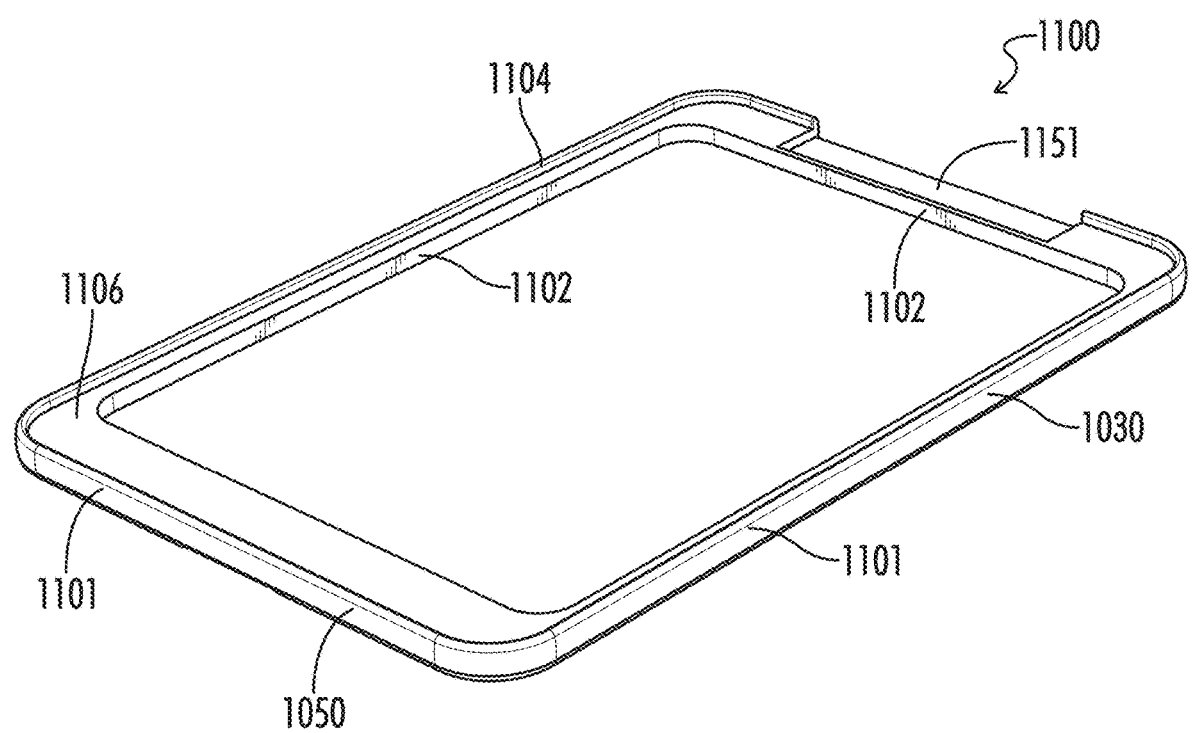
FIG. 13 is a back face perspective view rendering of the frame structure employed in the case illustrated in FIG. 1 in isolation.

As best illustrated in FIGS. 10 and 11, the back face panel 1300 is comprised of an internal panel 1310 and an outer panel 1320. The outer panel 1320 defines a battery compartment 1321 that houses a rechargeable battery 1325. The outer panel 1320 includes a flat perimeter region 1329 that is configured to mates with the perimeter surface of the internal panel 1310. A rigid battery tray 1327 is included to further protect and support the rechargeable battery 1325. The outer panel 1320 may be formed of any suitable materials. In an implementation, the outer panel 1320 is formed of a multi layered construct comprising a compression molded EVA sheet core that is laminated on its outer surface with a fabric, the same fabric as that laminated on the outer surface of the front face panel 1200. Once the multi-layered construct is formed the multilayered construct is molded into shape to define the battery compartment 1321 and cut to size for assembly to the other components. The internal panel 1310 may be formed of a soft or flexible material to serve as a cushion between the rechargeable battery 1325 and the electronic device contained in the device compartment 1600. In one embodiment, the internal panel 1310 has the same material as that of the front face side panel 1200. Alternatively, the internal panel 1310 may be formed of other suitable material such as a thin sheet of rigid plastic or other polymer. The surface of the internal panel 1310 that faces the device compartment 1600 may be lined with a suitable fabric such as faux fur to protect the device.

The rechargeable battery 1325 may be comprised of one or more rechargeable batteries or battery banks connected to a PCB 1410. The PCB 1410 is connected to the rechargeable battery 1325 via connection 1326 (illustrated in the block diagram of FIG. 16) and controls the charging and discharging of the rechargeable battery 1325. Mounted to the PCB are the electrical interfaces 1421, 1422, 1431, 1432, which may be any suitable standard or proprietary connector such as a USB connector, a contact connector, an Apple Lightning connector, and/or a magnetically retained connector.

The external electrical interfaces 1421 and 1422, in one implementation, may be USB type A and USB type C female connectors, respectively, that are adapted to allow for charging into and out from the rechargeable battery 1325. The internal electrical interfaces 1431 and 1432 are selected and positioned to enable connection with the electrical interface or connector on the portable electronic device when the device is inserted into the case. Thus for example, if the portable electronic device includes a USB type C female connector on one of its sides then the internal electrical interfaces 1431 and/or 1432 would be a mating USB type C connector and positioned to operationally align into connection with the device connector when the device is inserted into the case. Similarly, if the for example the portable electronic device includes an Apple Smart connector, then the internal electrical interfaces 1431 and/or 1432 would be of the same type and positioned internally within the sleeve compartment to operationally align with the Apple Smart connector on the device when the device is inserted into the case. Magnetically retained connectors, such as the Apple MagSafe connector and those described in U.S. Pat. No. 7,658,613, which is hereby incorporated by reference in its entirety, may also be used as internal electrical interfaces 1431 and/or 1432 to facilitate alignment and connection to the device. In one implementation, an electrical adaptor is provided that connects to the portable electronic device connector on one side and provides a magnetic or contact connection on the other side which is adapted to interface with the internal electrical interfaces positioned within the sleeve compartment.

The positioning of the internal electrical connectors 1431 and 1432 is determined to correspond with the position of the corresponding electrical connectors on the device. Positioning the internal electrical connectors 1431 and 1432 in the sleeve so that one of the internal electrical connectors is in operational alignment with a corresponding device connector when the device is inserted into the sleeve in a first orientation and a second internal electrical connecter is in operational alignment with a corresponding device connector when the device is inserted in the sleeve in a second orientation allows the case to charge the device when the device is inserted in the sleeve from different sides or upside down. For devices that have multiple charging ports or connectors, a plurality of internal electrical connectors positioned in the sleeve compartment allows the case to charge the device through one or more device connectors simultaneously or in the alternative.

Figure 18:
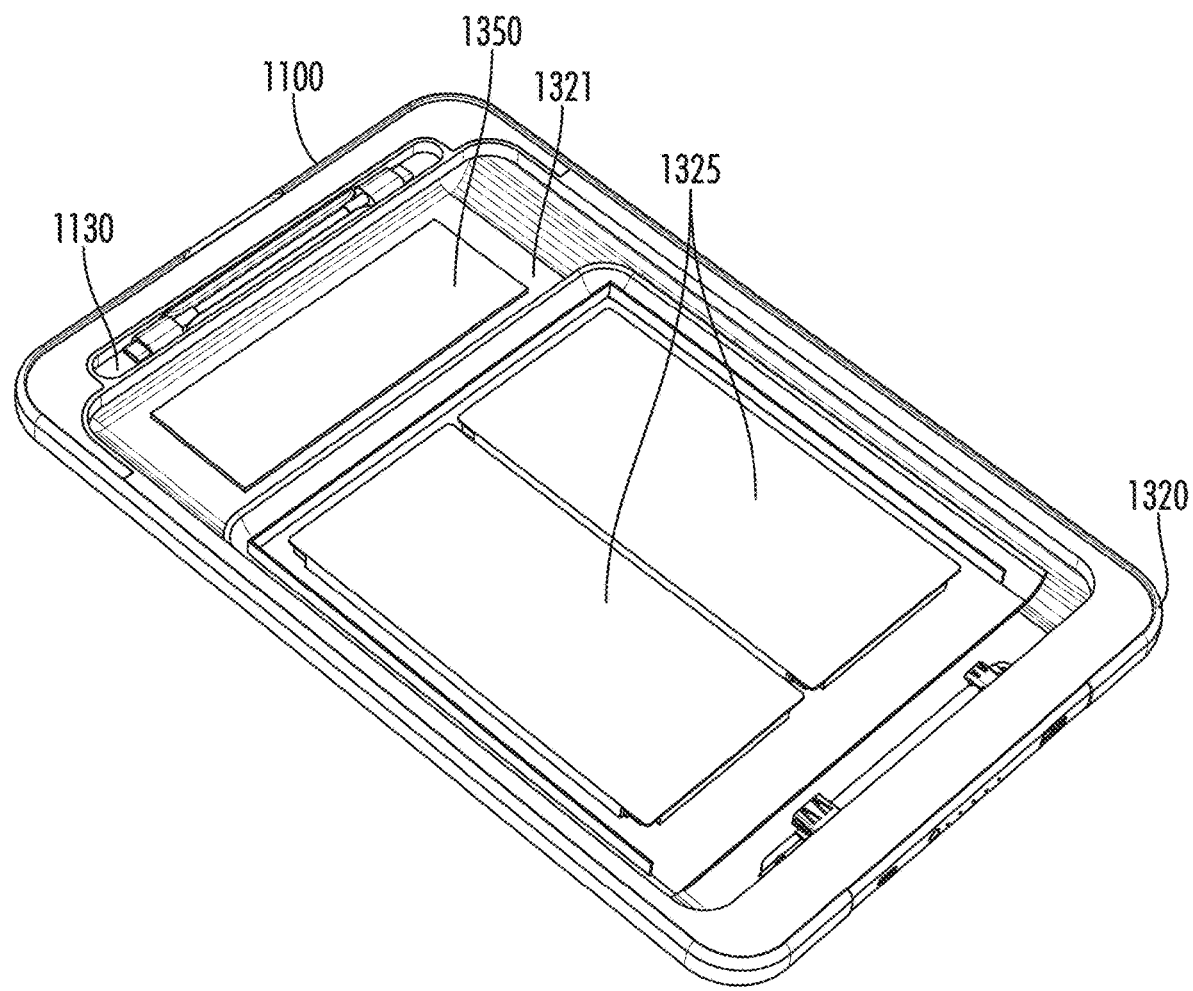
FIG. 18 is a perspective view of the case depicted in FIG. 10 with the internal panel of the back face side panel removed to better illustrate the battery compartment, rechargeable battery housed therein, a wireless charging component housed therein, and the internal configuration of the outer panel of the back face side panel.

In one embodiment, one or more wireless (or inductive) charging component 1350 can be included in the battery compartment 1321, or other locations in the power sleeve case 1000, as best shown in FIG. 18. The wireless charging components 1350 may include one or more wireless charging receivers and or wireless charging transmitters. The wireless charging components 1350 may be configured to charge one or more wireless charging enabled devices (e.g., phone, tablet, smart watch, etc.) housed in or adjacent to the power sleeve case 1000. In this configuration, the wireless charging components 1350 includes an inductive transmitter that is adapted to wirelessly charge a correspondingly enabled device in sufficient proximity to the transmitter (e.g., housed in or on top of the power sleeve case 1000) by transmitting power from the rechargeable battery 1325 and wirelessly transferring that energy to a wireless receiver of the wireless charging enabled device to thereby power the device and/or recharge the battery of the wireless charging enabled device.

In another embodiment, the wireless charging components 1350 may be configured to include an inductive wireless receiver that is capable of receiving charge from an external corresponding wireless transmitter and transmitting that charge to the rechargeable battery 1325 positioned in the power sleeve case 1000, thereby recharging the battery 1325 wirelessly. Hence, power from an external power source can be transferred to the rechargeable battery 1325 through the wireless charging component 1350.

Further, it should be understood that the wireless charging components 1350 may include both inductive receiver and transmitters to facilitating recharging of the rechargeable battery 1325 and wireless charging of wireless charging enabled devices as described above. The wireless charging components 1350 may be compatible to one or more wireless charging standards (for example, Qi, PMA, AirFuel Alliance standards, etc.).

Figure 15:
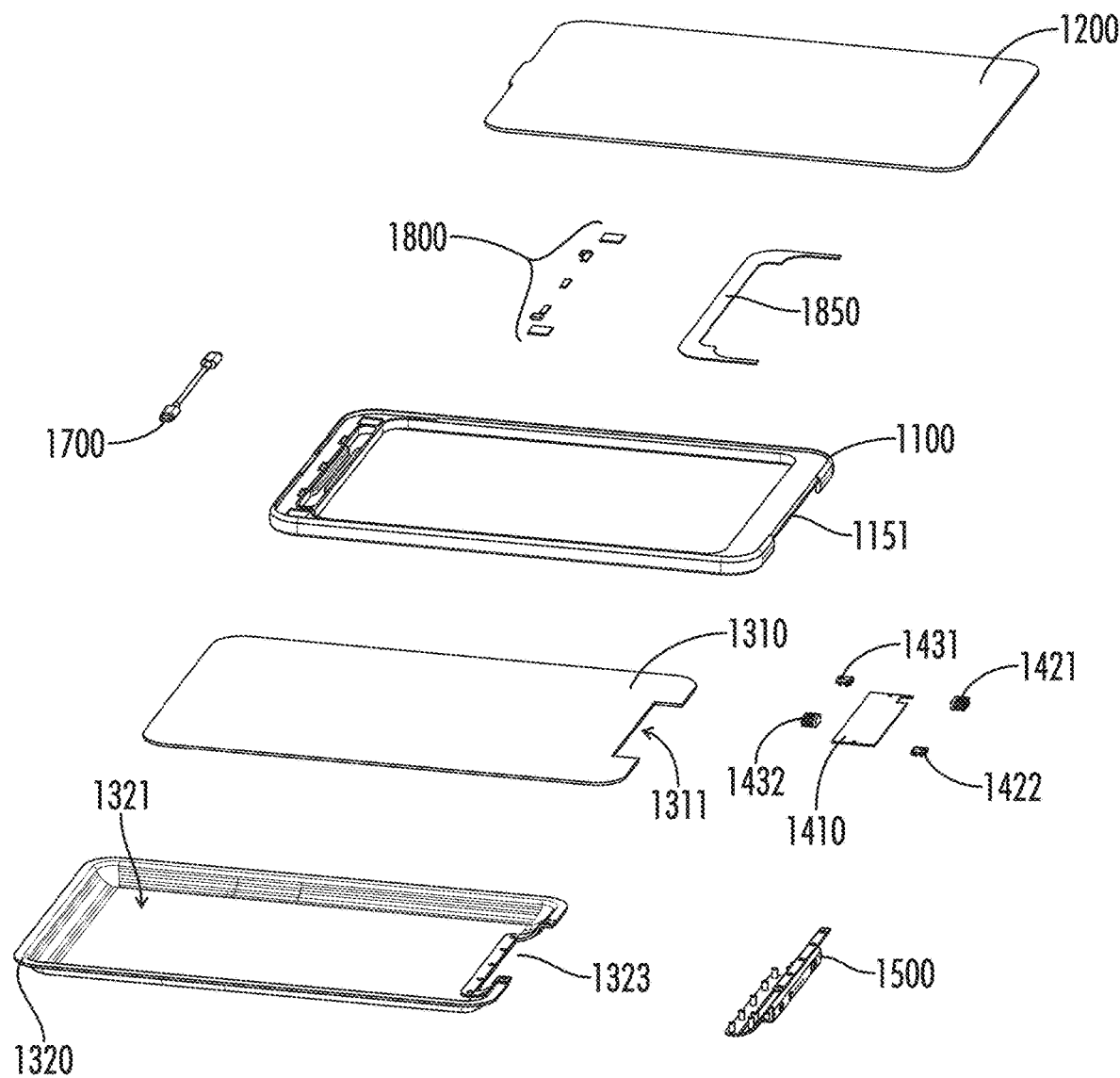
FIG. 15 is an exploded view line drawing of some of the components of the case illustrated in FIG. 1. The rechargeable battery is not depicted.
Figure 16:
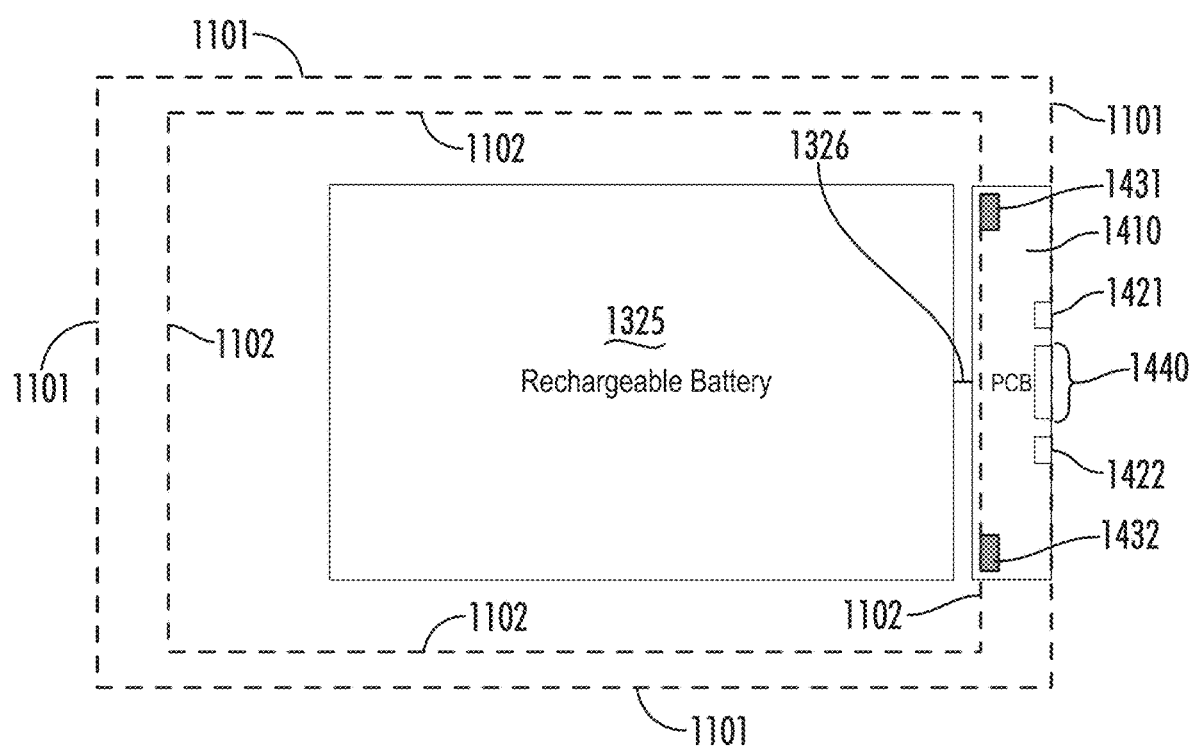
FIG. 16 is a block diagram of electrical components employed in the case illustrated in FIG. 1.

As best illustrated in FIG. 15, with reference to the drawings illustrating the fully or partially assembled case 1000, the rigid mounting support 1500 secures the electrical components 1410, 1421, 1422, 1431, 1432, 1440 and 1445 to the back face panel 1310 via an opening 1323 in the outer panel 1320, a corresponding opening 1311 in the internal panel 1310, and a corresponding control panel cut out 1151 in the bottom side of the frame structure 1100. Hence those electrical components are housed within the back panel 1300 and the frame structure 1100, which surrounds and provides protection and support to the internal and external electrical interfaces 1421, 1422, 1431, 1432, the PCB 1410 and the other components thereon.

It should be understood that while the opening flap 1201 to the sleeve compartment 1600 in the illustrated embodiment is located on the shorter side of the case 1000, in other implementations, the opening flap 1201 can be located on the longer side of the case 1000. Further, in other implementation, a case can have multiple openings, for example openings on both of the shorter sides or openings on both of the long sides a mix of openings on the shorter and longer sides of the case.

It should also be understood that while, in a specific implementation, the frame structure 1100 may be made from EVA, the frame structure 1100 may be made of other polymers as well. EVA is copolymer of ethylene and vinyl acetate. The weight percent vinyl acetate usually varies from 10 to 40 percent, with the remainder being ethylene. EVA is often referred to as expanded rubber or foam rubber. EVA is a polymer that approaches elastomeric materials in softness and flexibility, yet can be processed like other thermoplastics. The material has good clarity and gloss, low-temperature toughness, stress-crack resistance, hot-melt adhesive waterproof properties, and resistance to ultraviolet (UV) radiation. The EVA provides cushioning or padding for the sides of the hybrid sleeve. Other polymers other than EVA that may be used instead of or in combination with EVA, include for example, elastomer, elastic polymer, elastomeric compound, thermoplastic elastomer (TPE), polyvinyl chloride (PVC), polyurethane, polystyrene, rubber, silicone, and others. An elastomer is a polymer with viscoelasticity (or "elasticity"), generally having low Young's modulus and high failure strain compared with other materials. Other frame structure 1100 materials may include cork, carbonate, polycarbonate, thermoplastics, and thermoplastic polyurethane (TPU), in any combination. In addition, in an implementation the material that forms frame structure 1100 can be a foam (e.g., polymer or other substance with trapped bubbles) that provides cushioning or padding. Some examples of foam include quantum foam, polyurethane foam (foam rubber), XPS foam, polystyrene, phenolic, or many other manufactured foams. The frame structure 1100 materials may in some implementations not be a foam or elastic like EVA, but have hard or rigid panel to absorb impacts instead of the contents of the case. The hard panel or surface (e.g., polycarbonate) can crack, shatter, or fracture on impact to distribute the energy of the impact. In an implementation, the cracked panels can be replaced with replacement panels. Or the entire case can be replaced after the impact-absorbing panels are spent due to an impact.

In an implementation, the front face side panel 1200 and the outer panel 1320 of the back face side panel 1300 are made of neoprene. Neoprene or polychloroprene is a family of synthetic rubbers that are produced by polymerization of chloroprene. Neoprene provides cushioning and shock absorption for the device which the case protects.

In other implementations, the front face side panel 1200 and the outer panel 1320 of the back face side panel 1300 are made from other soft materials, such as fabric (e.g., cotton, wool, linen, polyester, microfiber, or fabric blends), ballistic nylon, woven carbon fiber, thermoplastic elastomer (TPE) material via a mold, other polymer, or others, in any combination. The fabrics can include fibers that are woven, nonwoven, or knitted. Other materials can be used including silicone, rubber, and many others. Other examples of materials include vinyl, polyvinyl chloride (PVC), plastic, thermoplastic, cloth, leather, suede, artificial leather, synthetic leather, synthetic leather made of plastic (sometimes referred to as pleather), poromeric imitation leather, koskin, leatherette, carbon fiber, air mesh, polyurethane (PU), welded polyurethane film, nylon, and polyester, in any combination.

In an implementation, the front face side panel 1200 and the outer panel 1320 of the back face side panel 1300 are made a nylon or polyester fabric that is environmentally friendly. The fabric can have a dope-dyed fiber, where the color originates from the addition of color chips in the process of polymerization. This avoids the dyeing process, which can causes unneeded pollution and greenhouse gases. Examples of dope-dyed fiber fabric are Ecoya® from LIBOLON and woolinex, etc. The fabric for the panels can have a heathered pattern.

In an implementation, compared to the frame structure 1100, the materials for the front face side panel 1200 and/or the outer panel 1320 of the back face panel 1300 are less rigid or more elastic than the frame structure 1100. The soft panels (e.g., neoprene) can adapt or conform (e.g., stretch) to the surface and shape of the contents being held in sleeve. The frame structure 1100 is less elastic and has less stretch than the front face and outer panel of the back face side panel. The frame structure 1100 provides a structure for absorbing impacts and protecting the contents of the sleeve case 1000.

In an implementation, the frame structure 1100 is more shock absorbing than the material that forms the front face side panel 1200 and/or the outer panel 1320 of the back face side panel 1300. To absorb shock, kinetic energy such as generated during the impact against the case is turned into heat and absorbed by the material instead of transferring the impact energy to the device being protected by the case. This frame structure 1100 is more rigid than the material that forms the front face side panel and/or the outer panel of the back face side panel material. The frame structure 1100 can be a foam, and the trapped bubbles in the foam act like compressible springs to absorb the shock. And then after the shock has been absorbed, the frame elastically returns to its original shape (e.g., the bubbles in the foam expand back to their original shape).

The material that forms front face side panel 1200 and/or the outer panel 1320 of the back face side panel 1300 can also be a foam, but the spring constant (Hooke's law) for the compressible springs (bubbles) in the panel material is less than that for the frame. So, the panel material will not absorb as much kinetic energy as the frame.

The case can be made in any color, combination of colors, combination of hues, or combinations of colors and hues.

This description of the disclosure has been presented for the purposes of illustration and description. It is not intended to be exhaustive or to limit the disclosure to the precise form described, and many modifications and variations are possible in light of the teaching above. The embodiments were chosen and described in order to best explain the principles of the disclosure and its practical applications. This description will enable others skilled in the art to best utilize and practice the disclosure in various embodiments and with various modifications as are suited to a particular use. This description, is not to be interpreted as reflecting an intention that any claim require more features than are expressly recited in that claim. Rather, as the following claims reflect, inventive aspects lie in a combination of fewer than all features of any single foregoing disclosed embodiment.

What is claimed is:

1. A protective battery sleeve case for a portable electronic device having one or more externally accessible charging interfaces, said case comprising:
    a frame structure comprising:
        (i) a frame border having an exterior edge and interior edge, the exterior and interior edges being separated by a frame border width and wherein the interior edge surrounds a perimeter of a first compartment for the portable electronic device;
        (ii) a generally T-shaped cross section having a first portion extending in a first direction and a second portion extending in a second direction, transverse to the first direction, wherein the first portion comprises the exterior edge and the second portion comprises the interior edge, and wherein the first portion has a first length from a first end to a second end in the first direction, and the second portion has a second length from a third end to a fourth end in a second direction, the second portion is coupled to the first portion, at a point between the first and second ends, and extends in the second direction away from the first portion a second length, and
        (iii) a first material whereby sides of the portable electronic device are cushioned against side impacts by the first material;
    a first side panel coupled to a first side of the frame border, wherein the first side panel is flexible and cushioned and comprises a second material, different from the first material;
    a second side panel coupled to a second side of the frame border, wherein the second side panel is opposed to the first and comprises a third material shaped to define a second compartment;
    a rechargeable battery housed within said second compartment and adapted for charging said portable electronic device;
    one or more inductive charging components housed within the second compartment and configured to enable wireless charging of the portable electronic device when the device is in the protective case and wireless charging of the rechargeable battery;
    an LED charge indicator electrically coupled to said rechargeable battery and adapted to indicate the level of charge in the battery, said LED charge indicator being externally visible and mounted to said frame structure;
    a third compartment formed in said frame structure having a charging cable housed therein; and
    a mounting plate having a PCB mechanically coupled thereto, said mounting plate being attached to the back face panel, wherein said PCB is electrically connected to the rechargeable battery, the externally and internally mounted electrical interfaces, the user control button, the LED charge indicator to enable charging to and from the rechargeable battery and control there over.

2. The case of claim 1, wherein the first material is more shock absorbing than the second material.

3. The case of claim 2, wherein the first material comprises a foam ethylene vinyl acetate (EVA), and wherein the second material comprises synthetic rubber.

4. The case of claim 3, wherein the first material comprises an injected molded foam ethylene vinyl acetate, wherein the second material comprises a polychloroprene, and wherein the third material comprises a compression molded EVA.

5. The case of claim 1, wherein the first side panel is coupled via stitching to the first side of the frame structure.

6. The case of claim 1, wherein the second side panel is coupled via stitching to the second side of the frame structure.

7. The case of claim 1, wherein a first spring constant for the first material is greater than a second spring constant for the second material.

8. The case of claim 1, wherein the first material comprises a greater rigidity than that of the second material.

9. The case of claim 1, wherein said mounting plate being more rigid than said first, second, or third materials.

10. The case of claim 9, wherein said mounting plate comprises metal.

11. The case of claim 9, wherein said mounting plate comprises a rigid polymer.

12. The case of claim 1, wherein said back face panel is comprised of an internal panel and an outer panel, wherein said outer panel is formed of the third material and is shaped to define the second compartment.

13. The case of claim 12, wherein said internal panel covers the second compartment and is more proximate to the frame structure than the outer panel.

14. The case of claim 1, wherein the first panel is comprised of a multilayered construct comprising a first fabric laminated on an interior facing surface of the second material and a second fabric laminated on an opposing exterior facing surface of the second material, and wherein said first fabric and second fabric are different from one another and wherein said first fabric and second fabric are formed of materials different than said first, second, or third materials.

15. The case of claim 1 further comprising an electrical interfaces externally mounted on the case.

16. The case of claim 1 further comprising an electrical interfaces internally mounted within the first compartment, wherein the electrical interfaces are selected from a group consisting of: an USB connector, a contact connector, an Apple Lightning connector, and a magnetically retained connector.

17. The case of claim 16, wherein the USB connector is a USB Type C male connector.

18. The case of claim 16, wherein the contact connector is an Apple Smart connector.

19. The case of claim 16, wherein the magnetically retained connector is an Apple MagSafe connector.

20. The case of claim 16, wherein the magnetically retained connector is a connector described in U.S. Pat. No. 7,658,613.

\* \* \* \* \*